INVENTOR
JOHN G MACDONALD
Attorney

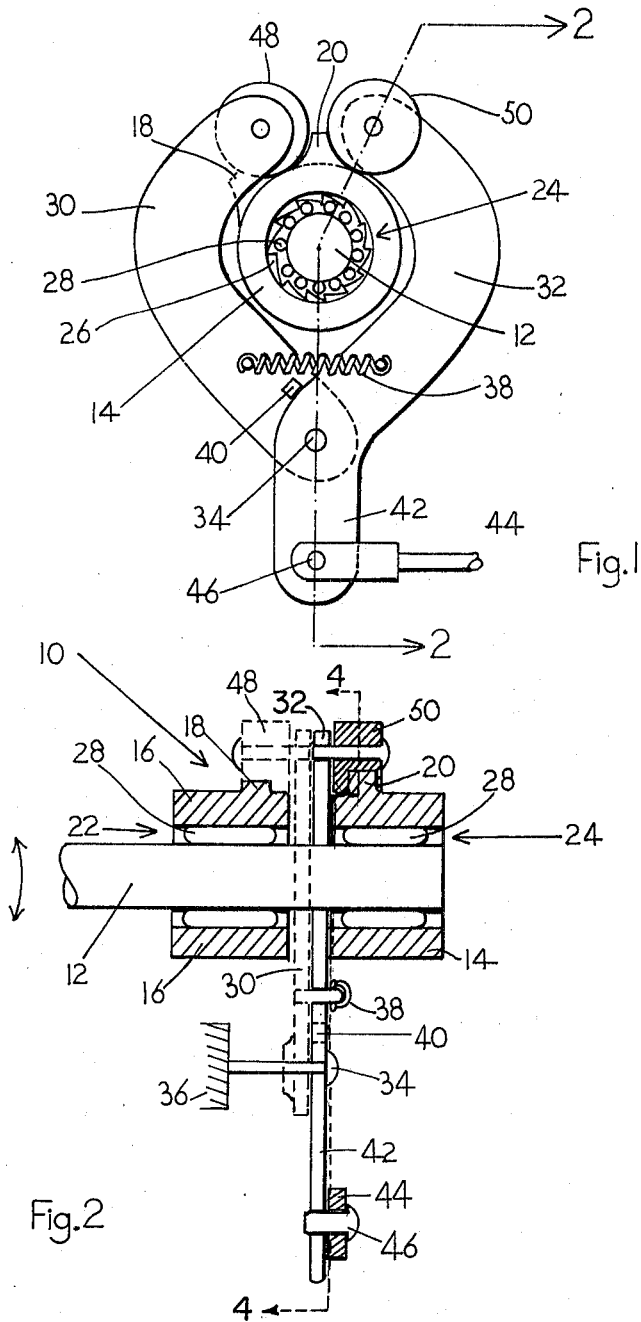

United States Patent Office 3,491,605
Patented Jan. 27, 1970

3,491,605
ROTATIONAL SENSING CLUTCH MECHANISM
John G. MacDonald, Goderich, Ontario, Canada, assignor to The Dominion Road Machinery Co. Limited, Goderich, Ontario, Canada
Filed Feb. 16, 1968, Ser. No. 706,048
Int. Cl. F16h 21/44, 21/54, 25/18
U.S. Cl. 74—96
2 Claims

ABSTRACT OF THE DISCLOSURE

A reversible rotary shaft mounts a pair of roller clutches disposed in opposite relation so that when the shaft turns in one direction one of the clutches will lock and on reversal of the shaft the other clutch will lock. Each clutch has an outwardly projecting cam. A pair of arms located on a common pivot surround the shaft so that the free end of one arm is positioned in the path of rotation of the cam member of one clutch and the free end of the other arm is similarly positioned over the other clutch. The arms are urged together by a spring, the inward movement being restrained by a stop on one of the arms. When the shaft rotates in one direction the cam of the locking clutch will strike the free end of the arm located in its path of rotation thus causing the arms to move in one direction on the common pivot. On reversal of rotation of the shaft the other clutch locks and its cam strikes the free end of the other arm thus moving both arms around the pivot in the opposite direction.

BACKGROUND OF THE INVENTION

Field of the invention

This invention relates to a clutch mechanism which automatically shifts the position of a lever in response to the direction of rotation of a shaft.

Description of the prior art

U.S. Patent 3,293,943 "Hydrostatic Transmission Systems and Controls Therefor" illustrates a clutch mechanism carried on a reversibly rotatable shaft which mechanism shifts the position of a lever in response to the direction of rotation of the shaft, the clutch mechanism employing a series of friction plates urged together by a spring. The clutch mechanism operates a lever acting on a valve, which, in turn, is connected through separate hydraulic lines to a pair of spaced apart power clutches. When the shaft rotates in one direction the action on the plates of the clutch mechanism moves the lever acting on the valve in a direction to lock up one of the power clutches; when the direction of rotation of the shaft is reversed the lever is moved in the opposite direction to actuate the valve so as to lock up the other power clutch.

SUMMARY OF THE INVENTION

The clutch mechanism of the invention consists in mounting a pair of roller clutches on a reversible rotary shaft, the clutches being disposed in opposite relation so that when the shaft turns in one direction one of the clutches will lock, leaving the other unlocked, and when the shaft turns in the opposite direction the unlocked clutch will lock and the locked clutch will become unlocked. Each clutch has an outwardly projecting cam member. A pair of arms, located on a common pivot, extend in opposed relation around the shaft to the extent that the free end of one arm is positioned over one of said roller clutches in the path of rotation of the cam member thereon when the said one clutch is locked; the free end of the other arm is similarly positioned over the other roller clutch. The arms are biased together by a spring member, the inward movement being terminated by a stop located on one of said arms. One of the arms extends beyond the common pivot point to form an actuating lever. The arrangement is such that when the shaft rotates in one direction one clutch will lock and the cam member thereon will strike the free end of the arm located in the path of rotation of the cam thus causing the lever to move in a first direction. On reversal of rotation of the shaft the locked clutch unlocks and the other clutch then locks and the cam thereon strikes the free end of the other arm thus actuating the lever in a second direction opposed to the first direction of movement.

This simple reversible clutch mechanism carried on a rotary shaft accomplishes the result of bringing a lever in one of two directions, which clutch mechanism is not susceptible to production of heat due to friction.

The reversible clutch mechanism has a minimum number of wearing parts and does not produce a constant friction drag when the shaft which supports the mechanism is turning.

The clutch mechanism requires a minimum amount of adjustment and can be manufactured at relatively low cost.

BRIEF DESCRIPTION OF THE DRAWINGS

The invention will now be described in relation to the accompanying drawings, in which:

FIGURE 1 shows an end view of the clutch mechanism with the shaft stationary;

FIGURE 2 is a sectional view taken through line 2—2 of FIGURE 1;

DESCRIPTION OF THE PREFERRED EMBODIMENTS

Figure 3:
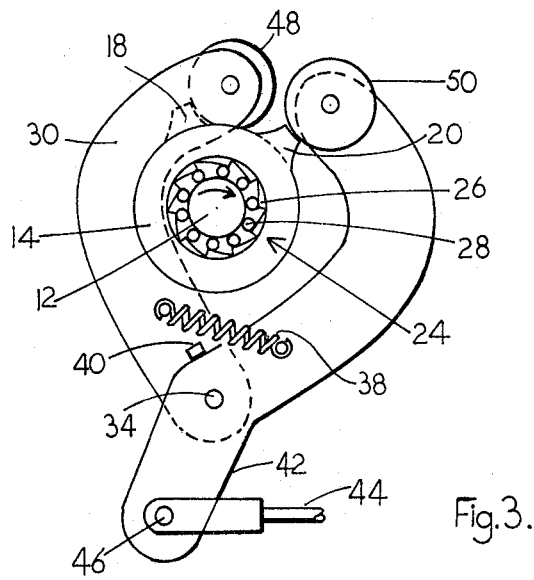
FIGURE 3 is the same end view as that shown in FIGURE 1 but showing the shaft turning in a clockwise direction.

With reference to the drawings and more particularly to FIGURE 2 the clutch mechanism, generally denoted by the numeral 10, is mounted on a shaft 12 which may be driven in either direction of rotation. The clutch mechanism 10 includes a pair of hollow members 14 and 16 which are mounted side by side on the shaft 12. Each hollow member 14 and 16 has respectively an outwardly projecting lobe 18 and 20; as illustrated more particularly in FIGURE 1 the opposed sides of each lobe 18 and 20 in line with the longitudinal axis of the shaft 12 are concave.

Each hollow member 14 and 16 contains an identical roller type free wheeling clutch, generally denoted by the numerals 22 and 24. Only one clutch 24 will be described and it comprises a series of saw toothed ramps 26 with rollers 28 disposed between the crests of the ramps 26. The action is such that in one direction of rotation of the shaft 12 the rollers 28 in the clutch 24 ride towards the convergence of the ramps 26 with the shaft 12 thereby causing the clutch 24 to engage with the shaft 12 and rotate the surrounding hollow member 14; in the opposite direction of rotation of the shaft 12 the rollers 28 fall away from the ramps 26 thus disengaging the clutch 24 from the surrounding hollow member 14.

Figure 4:
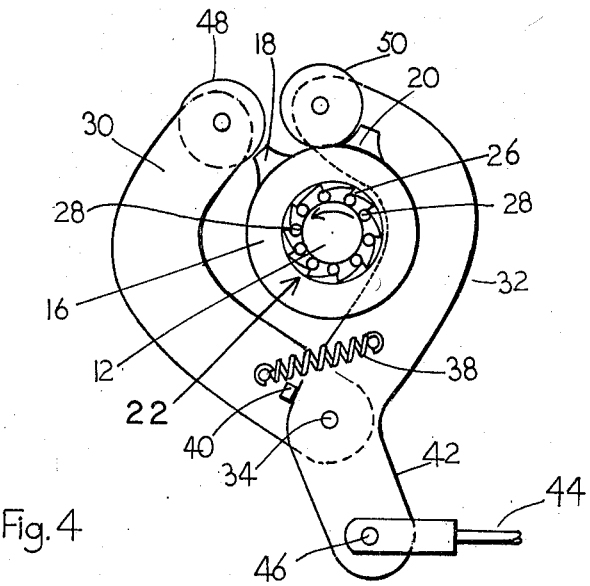
FIGURE 4 is a sectional view taken through line 4—4 of FIGURE 2 showing the shaft turning in an anticlockwise direction.

It is a feature of the mechanism that the ramps 26 in the clutches 24 are disposed in opposite relation to the ramps 26 in the clutch 22; compare FIGURES 3 and 4. As a result when the shaft 12 turns in the clockwise direction as shown in FIGURE 3 the rollers 28 in the clutch 24 ride along the ramps 26 to lock the surrounding hollow member 14 onto the shaft 12. However, with the same direction of rotation of the shaft 12 the corresponding rollers 28 in the clutch 22 free wheel within the surrounding hollow member 16. On reversal of direction of the rotation of the shaft 12, i.e. anticlockwise, the clutch 24 becomes unlocked and the clutch 22 becomes locked due to the action of the rollers 28 on the ramps 26, as illustrated in FIGURE 4.

A pair of arcuately shaped arms 30 and 32 are pivoted together on a pin 34, see FIGURE 2, secured to a suitable support 36. The arms 30 and 32 curve in opposed relation with respect to the shaft 12. The arms 30 and 32 are biased together by a spring 38, the movement of the arm 32 towards the arm 30 being terminated by a stop 40 which is mounted on the arm 30. The arm 32 extends beyond the pivot 34 to provide an integral extension 42 which, in turn, is secured to an actuating rod 44 through a pivot 46.

It will be observed more particularly from FIGURE 1 that the perimeter of the rollers 48 and 50 match the concavity of the sides of the lobes 18 and 20.

The free end of each of the arms 30 and 32 carry respectively a roller 48 and 50. The arrangement is such that the roller 48 lies in the path of rotation of the lobe 18 on the hollow member 16 when the latter is locked onto its contained clutch 22; the other roller 50 lies in the path of rotation of the lobe 20 on the hollow member 14 when the latter is locked onto its contained clutch 24. The operation of the clutch mechanism 10 may be observed from FIGURES 3 and 4. In FIGURE 3 the shaft 12 is shown to be turning in a clockwise direction. As a result the rollers 28 of the contained clutch 24 advance along the ramps 26 thus causing engagement of the shaft 12 with the surrounding hollow member 14 and rotation of the integral lobe 20. This strikes against the roller 50 thus causing the arm 32 to move the actuating rod 44 in the direction indicated in FIGURE 3. Since the other clutch 22 in the hollow member 16 remains unlocked the lobe 18 will simply contact the roller 48 and remain stationary while the shaft 12 continues to turn in a clockwsie direction.

When the shaft 12 turns in an anticlockwise direction as shown in FIGURE 4 the free wheeling clutch 24 proceeds to unlock and the surrounding hollow member starts to rotate while the previously unlocked clutch 22 locks. The locking of the clutch 22 causes anticlockwise rotation of the lobe 18 and this strikes against the roller 48 thus causing the arm 30 to move the actuating rod 44 in the direction indicated in FIGURE 4.

The spring 38 allows the arm 30 to move away from the arm 32 in the event that the lobes 18 and 20 become wedged between the rollers 48 and 50. The action of the spring 38 permits the rollers 48 and 50 to assume any related position without jamming and damaging of the unit.

I claim:

1. A clutch mechanism on a reversible rotary shaft comprising a pair of roller clutches mounted side by side on said shaft, said clutches being disposed in opposite relation so that when the shaft turns in one direction one of the clutches will lock, leaving the other unlocked, and when the shaft turns in the opposite direction the unlocked clutch will lock and the locked clutch will become unlocked, an outwardly projecting cam member on each of said clutches, a pair of arms located on a common pivot extending in opposed relation around said shaft to the extent that the free end of one of said arms is positioned over a respective one of said roller clutches in the path of rotation of the cam member thereon when the said one clutch is locked and the free end of the other arm is similarly positioned over the other roller clutch, spring means biasing said arms together, stop means terminating said biasing, the arrangement being such that when the shaft rotates in one direction the cam member on the unlocked clutch strikes the free end of said one arm thus causing said arms to pivot in a first direction and when said shaft is reversibly rotated the unlocked clutch unlocks and the other clutch locks with the cam thereon striking the free end of the other arm thus pivoting said arms in a second direction opposed to the first direction of pivoted movement.

2. A clutch mechanism according to claim 1 wherein said other arm has an integral extension thereto extending beyond said pivot point.

References Cited

UNITED STATES PATENTS 2,563,302   8/1951   Atkinson et al.

MILTON KAUFMAN, Primary Examiner